(12) United States Patent
Newman

(10) Patent No.: US 9,253,187 B2
(45) Date of Patent: Feb. 2, 2016

(54) COMPUTER SYSTEM AND METHOD

(71) Applicant: My1Login Ltd., Glasgow (GB)

(72) Inventor: Michael Newman, Glasgow (GB)

(73) Assignee: My1Login Ltd., Glasgow (GB)

(*) Notice: Subject to any disclaimer, the term of this patent is extended or adjusted under 35 U.S.C. 154(b) by 0 days.

(21) Appl. No.: 14/381,463

(22) PCT Filed: Feb. 28, 2013

(86) PCT No.: PCT/GB2013/050495
§ 371 (c)(1),
(2) Date: Aug. 27, 2014

(87) PCT Pub. No.: WO2013/128190
PCT Pub. Date: Sep. 6, 2013

(65) Prior Publication Data
US 2015/0135290 A1 May 14, 2015

(30) Foreign Application Priority Data
Feb. 29, 2012 (GB) .................................. 1203576.2

(51) Int. Cl.
G06F 21/00 (2013.01)
H04L 29/06 (2006.01)
G06F 17/30 (2006.01)
G06F 21/31 (2013.01)

(52) U.S. Cl.
CPC ........ H04L 63/083 (2013.01); G06F 17/30864 (2013.01); G06F 21/31 (2013.01)

(58) Field of Classification Search
CPC .. G06F 17/30864; G06F 17/308; G06F 21/31
See application file for complete search history.

(56) References Cited

U.S. PATENT DOCUMENTS

2002/0105542 A1* 8/2002 Rosar ............................ 345/741
2004/0205530 A1 10/2004 Borg

FOREIGN PATENT DOCUMENTS

WO 03/102798 * 12/2003
WO 03/102798 A1 12/2003

OTHER PUBLICATIONS

International Search Report from related PCT Application No. PCT/GB2013/050495.

* cited by examiner

*Primary Examiner* — Jeffrey Pwu
*Assistant Examiner* — Thong Truong
(74) *Attorney, Agent, or Firm* — Benesch Friedlander Coplan & Aronoff LLP; Thomas Y. Kendrick

(57) ABSTRACT

A method for use in a simplified login system, involving operating a computer to identify user name, password and submit fields on a remote website. The method comprises identifying a password field on a webpage, defining a first area around the password field for a user name field and a second area around the password field for a submit field, locating a field for user text entry in the first area and locating a field for a user click entry in the second field. There is also described a computer programmed to carry out the method, a data carrier containing program data by which a computer may be programmed to carry out the method, and a secure password storage and login system comprising a central server and a number of user computers, and which operates using the method.

20 Claims, 3 Drawing Sheets

COMPUTER SYSTEM AND METHOD

CROSS-REFERENCE TO RELATED APPLICATIONS

This application is a National stage entry under 35 U.S.C. §371 of PCT Patent Application No. PCT/GB2013/050495, filed Feb. 28, 2013, which claims priority to United Kingdom Patent Application No. GB 1203576.2, filed on Feb. 29, 2012, each of which is hereby incorporated by reference.

FIELD OF THE INVENTION

This invention relates to an improved method of operating a computer in such a way as to simplify accessing remote websites, and to a computer system using such a method.

BACKGROUND OF THE INVENTION

Many websites require users to register a user name and password. It is common for even a casual user to have dozens of such accounts, and keeping track of one's user names and passwords becomes onerous. Many users for this reason use a single password on many accounts, which is detrimental to security.

A number of attempts have been made to address this problem, either by providing a secure storage area within the user's computer or by providing secure storage on a website. There have also been attempts to provide a system in which the relevant user name and password can be called from secure storage and automatically entered in the appropriate fields on the webpage. One such system is available as "Passpack". However, in known systems of this kind the user has to train the system by manually locating the user name, password and submit fields when first using a new website.

One object of the present invention is to provide a means for automatically locating these fields without user intervention. This is preferably done as part of a system providing secure storage and use of multiple user names and passwords, but may be applicable in other contexts.

Therefore, it is an object of the present invention to obviate, or at least mitigate, at least some of the drawbacks associated with the prior art.

SUMMARY OF THE INVENTION

To this end, the invention provides a method of operating a computer to identify user name, password and submit fields on a remote website, the method comprising:
(a) searching the code defining a webpage to identify a password field by locating code defining a field which is labelled as "password" and/or is configured to suppress display of characters typed in that field;
(b) defining a first threshold area around the password field in which a user name field is likely to occur, and a second threshold area around the password field in which a submit field is likely to occur;
(c) examining the webpage code in the first threshold area to locate a field for user text entry which, if found, is taken to be the user name field;
(d) examining the webpage code in the second threshold area to locate a field for a user click entry which, if found, is taken to be the submit field.

The first threshold area may be defined as an area of the displayed page extending above and to either side of the password field.

The second threshold area may be defined as an area of the displayed page extending from a relatively short distance above to a relatively larger distance below and to either side of the password field.

Optionally a possible user name field or submit field is ignored if it is associated with an inappropriate label or ID indicating another specific function.

Optionally step (c) is conducted by searching backwards through the code from the code defining the password input field.

Optionally step (d) is conducted by searching forward through the code from the code defining the password input field.

Typically, if said forward searching finds no submit field within the second threshold area, further searching is conducted by searching backwards through the code from the code defining the password input field.

The invention also provides a computer programmed to carry out the above method, and a data carrier containing program data by which a computer may be programmed to carry out the method.

From another aspect, the invention provides a secure password storage and login system comprising a central server and a number of user computers, the central server storing user names and passwords in encrypted form; in which a user may retrieve a desired password in encrypted form, the password being decrypted in the user's machine; the system using the foregoing method to automatically activate a third party webpage by locating said fields and entering the required data therein.

BRIEF DESCRIPTION OF THE DRAWINGS

An embodiment of the present invention will now be described, by way of example only, with reference to the drawings, in which.

DETAILED DESCRIPTION

In the following description, reference is made to a user name input field. This refers to any field in which text can be entered by the user to identify a particular user; it may be labelled "user name", "user ID" or similar. Likewise, reference is made in the following to a submit field. This refers to any feature which the user may click on to gain access to his account, and may be a submit field, a submit button, an image input, or a hyperlink.

Figure 1:
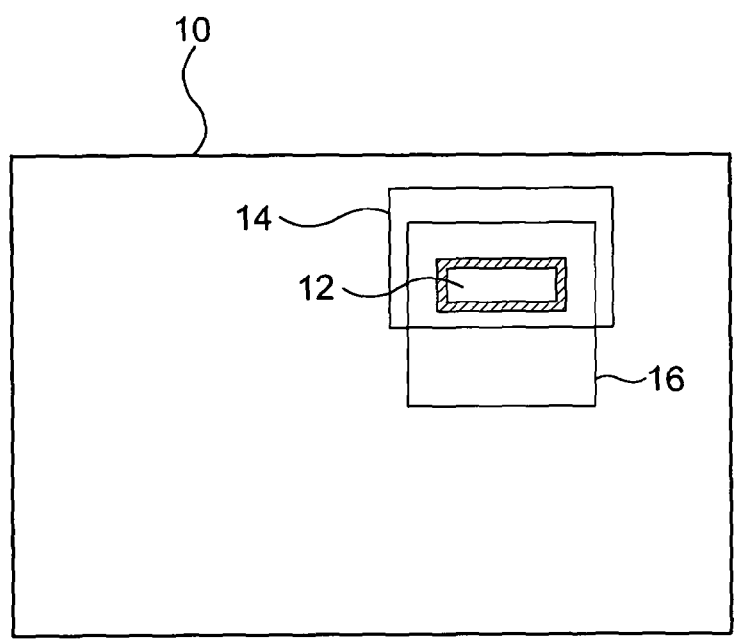
FIG. 1 is schematic representation of a webpage showing threshold areas referred to below.

Referring to FIG. 1, a webpage 10 has a password field 12. A feature of the invention is that first and second threshold areas are defined around the password field 12. The first threshold area 14 in this embodiment extends principally above and to either side of the password field 12, and to a short distance beneath. The second threshold area 16 in this embodiment extends principally below and to either side of the password field 12, and to a short distance above.

The threshold areas are those in which a user name input field and a submit field, respectively, are likely to occur. The sizes of these areas can be optimised by examining a range of websites.

Figure 2A:
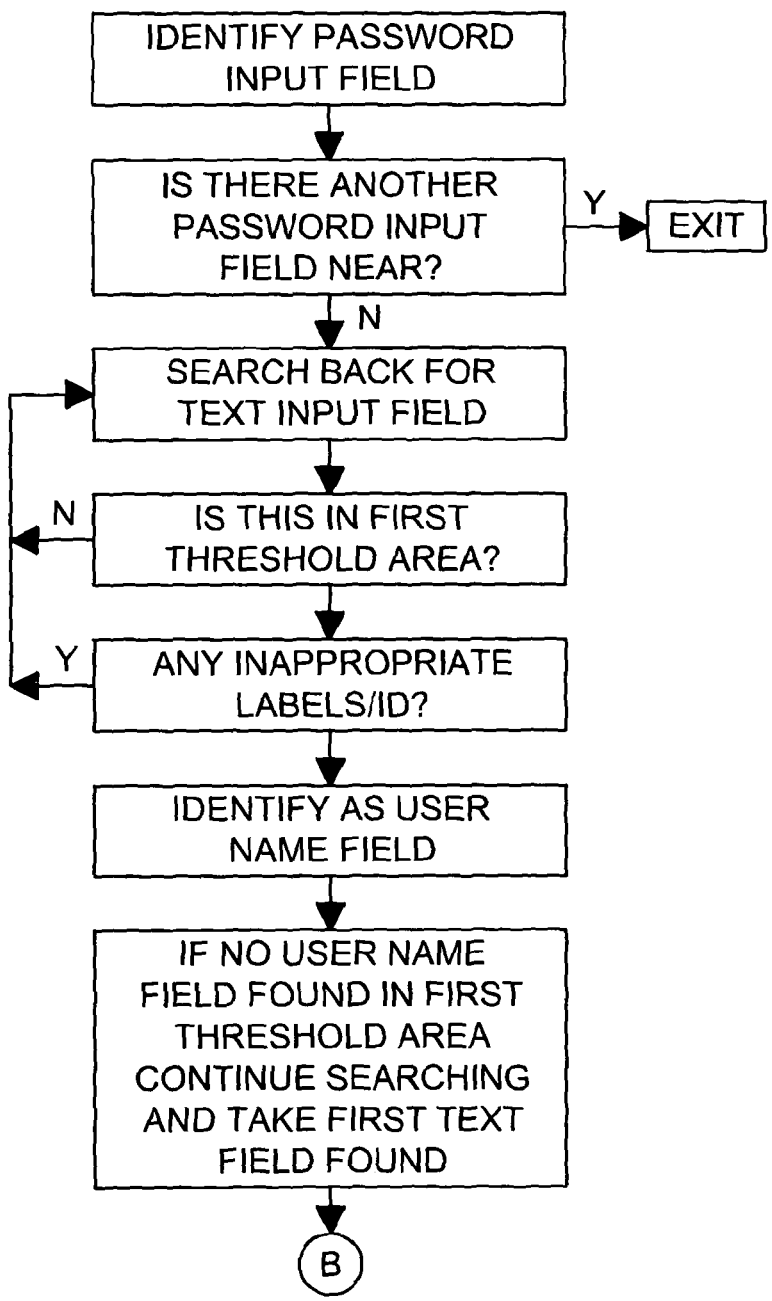
FIG. 2 is a flowchart illustrating one embodiment of the invention.
Figure 2B:
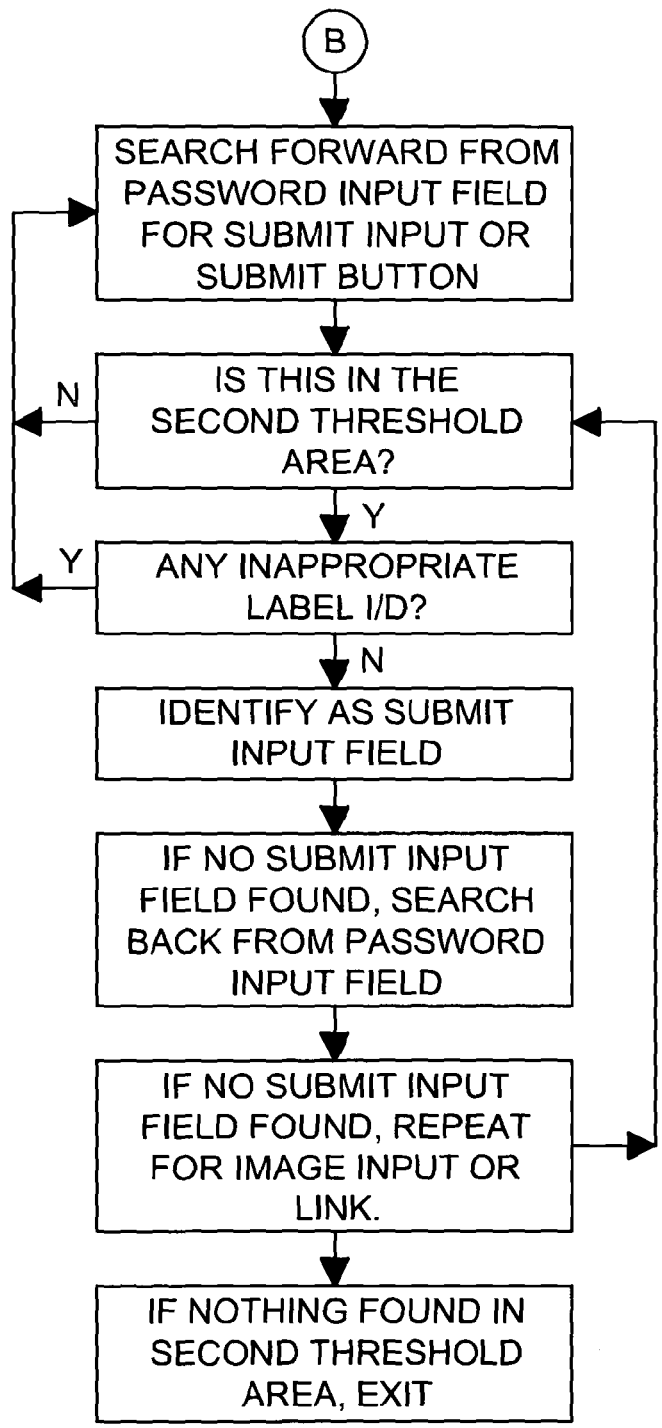

Referring to FIG. 2, the first step of the method is to identify the password input field. It is already known to do this for other purposes. The password input field can be identified by searching the webpage code for a field which is labelled as "password", or a field which accepts user text input but replaces display of the text with a series of spots, or both of these.

The code is then searched to determine whether a second password input field can be identified adjacent to the one already found. If so, this indicates that the web page is a registration page and thus unsuitable for the present method. If not, the webpage code is then searched from the password input field backwards for a text input field. If one is found, it is then determined whether this is within the first threshold area, and if so this is identified as a possible user name field.

If the text input field is not within the first threshold area, the backward searching continues in the same way.

When a possible user name input field is located, the code is examined for any inappropriate labels or ID tags. Possible inappropriate labels are "search" and "password"; others may be determined by experience. If the field has such an inappropriate label, then the backward searching is continued.

If no user name input field is found within the first threshold area, then the system assumes that the first text entry field found thereafter is the user name input field.

It is then necessary to locate the submit button or equivalent. As discussed above, this can occur in a variety of forms. In the present embodiment, the code is searched for a standard submit input or submit button and thereafter, if necessary, for another form of clickable entry.

Referring to the second part of FIG. 2, the code is searched forward from the password input field. If a submit input or submit button is found, it is determined whether this lies within the second threshold area. If not, the forward search is continued.

If a possible field is found within the second threshold area, it is checked for inappropriate labels or tags. In this case, inappropriate labels include not only "search" and "password" but also "register" and "sign up". Again others may be added with experience. If an inappropriate label is found, then the forward search continues. If not, this field is identified as the submit input field.

If no submit input field is found within the second threshold area after the password input field, then the foregoing is repeated in a search backward from the password input field; it is for this reason that the second threshold area extends somewhat above the password input field, as submit buttons are occasionally put in this area of screen.

If the submit input field is not found thus far, then the above is repeated but searching for an image input or a hyperlink.

In the unlikely event of the system failing to locate any of the required field, it becomes necessary for the user to input the required information manually. We have found that a commercially-available prior art system can successfully locate these three fields in about 80% of attempts, whereas a trial version of the present invention is successful in about 98% of attempts.

The method described above has been developed for use in a simplified login system which will now be briefly described.

The system is based on a web server. A user registers with the provider and supplies a single memorable word. This is the only item which the user has to remember in order to access multiple websites requiring user name and password.

For each website which he wishes to use, the user chooses a user name and password which are passed to the web server in encrypted form, using the memorable word as the encryption key, and this information is held on the server in encrypted form.

Thereafter, the user can call up the web server. The user logs in by entering his user name. He is prompted to enter three random characters from his memorable word, the entry suitably being done by clicking on a drop-down box to avoid key strokes which might be captured. If the correct characters are entered, the user's account is opened and the encypted information is sent to his computer where it is decrypted.

The user then goes to a desired website. A bookmarklet containing Java script is included in a toolbar. When the user clicks on this, the Java script causes the user name input field and the password input field to be identified as above, the correct data entered, and the submit input identified and operated.

This system ensures that passwords are stored securely and recalled and used easily. This in turn enables the use of passwords which are highly random and would be difficult to remember, and are thus highly secure. It also allows the user to avoid the use of the same or closely similar passwords on multiple sites.

The present invention thus provides novel technical effects in the interaction between a user, a secure storage facility, and multiple web sites, and provides faster and more secure access.

While this invention has been described with reference to the sample embodiments thereof, it will be appreciated by those of ordinary skill in the art that modifications can be made to the structure and elements of the invention without departing from the spirit and scope of the invention as a whole.

The invention claimed is:

1. A method for operating a computer to identify a user name field, a password field, and a submit field on a remote website, the method comprising the steps:
    (a) searching a code defining a webpage to identify a password field by locating code defining a field which is at least one of labelled as "password" and configured to suppress display of characters typed in that field;
    (b) defining a first threshold area around the password field in which a user name field is likely to occur, and defining a second threshold area around the password field in which a submit field is likely to occur;
    (c) examining the webpage code in the first threshold area to locate a field for user text entry which, if found, is taken to be the user name field; and
    (d) examining the webpage code in the second threshold area to locate a field for a user click entry which, if found, is taken to be the submit field.

2. The method of claim 1, wherein the first threshold area is defined as an area of the webpage extending above and to either side of the password field.

3. The method of claim 2, wherein the second threshold area is defined as an area of the webpage extending from a relatively short distance above to a relatively larger distance below and to either side of the password field.

4. The method of claim 2, wherein a possible user name field or a possible submit field is ignored if it is associated with an inappropriate label or ID indicating another specific function.

5. The method of claim 2, wherein step (c) is conducted by searching backwards through the code from the code defining the password input field.

6. The method of claim 2, wherein step (d) is conducted by searching forward through the code from the code defining the password input field.

7. The method of claim 1, wherein the second threshold area is defined as an area of the webpage extending from a relatively short distance above to a relatively larger distance below and to either side of the password field.

8. The method of claim 7, wherein a possible user name field or a possible submit field is ignored if it is associated with an inappropriate label or ID indicating another specific function.

9. The method of claim 7, wherein step (c) is conducted by searching backwards through the code from the code defining the password input field.

10. The method of claim 7, wherein step (d) is conducted by searching forward through the code from the code defining the password input field.

11. The method of claim 1, wherein a possible user name field or a possible submit field is ignored if it is associated with an inappropriate label or ID indicating another specific function.

12. The method of claim 11, wherein step (c) is conducted by searching backwards through the code from the code defining the password input field.

13. The method of claim 11, wherein step (d) is conducted by searching forward through the code from the code defining the password input field.

14. The method of claim 1, wherein step (c) is conducted by searching backwards through the code from the code defining the password input field.

15. The method of claim 14, wherein step (d) is conducted by searching forward through the code from the code defining the password input field.

16. The method of claim 1, wherein step (d) is conducted by searching forward through the code from the code defining the password input field.

17. The method of claim 16, wherein, if the forward searching finds no submit field within the second threshold area, further searching is conducted by searching backwards through the code from the code defining the password input field.

18. The method of claim 1, wherein the method is carried out using a programmed computer.

19. The method of claim 1, wherein the method is carried out using a data carrier containing program data with which a computer may be programmed.

20. The method of claim 1, wherein the method is carried out using a secure password storage and login system comprising a central server and a number of user computers, the central server storing user names and passwords in encrypted form; wherein a user may retrieve a desired password in encrypted form, the password being decrypted in the user's machine; and wherein the system automatically activates a third party webpage by locating the fields and entering the required data therein.

* * * * *